Nov. 20, 1956     A. W. LUNDSTRUM     2,770,955
AIR-CONDITIONING DEVICE FOR AN ATTIC
Filed May 17, 1954     3 Sheets-Sheet 1
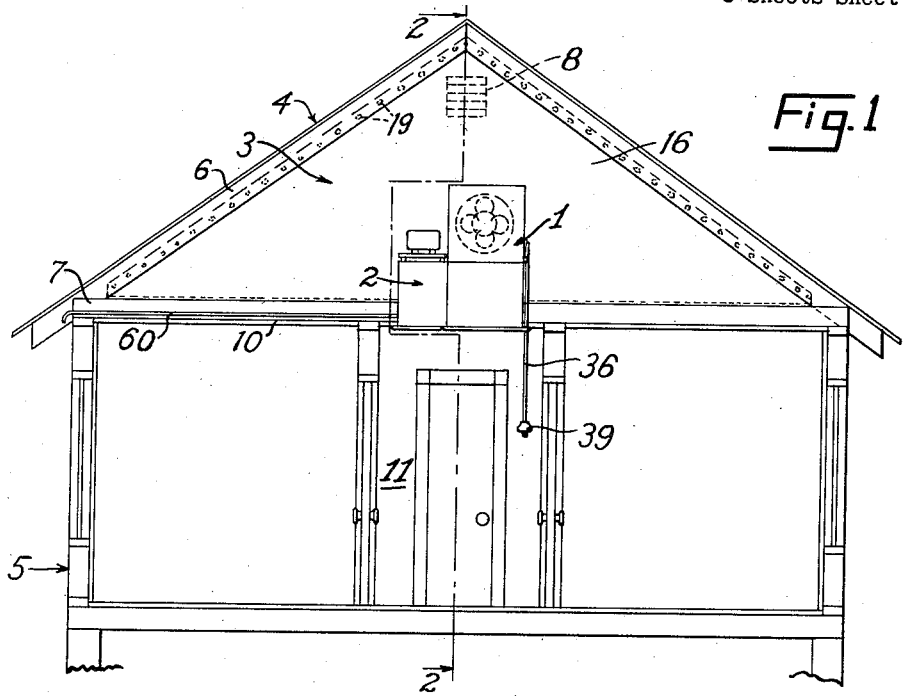
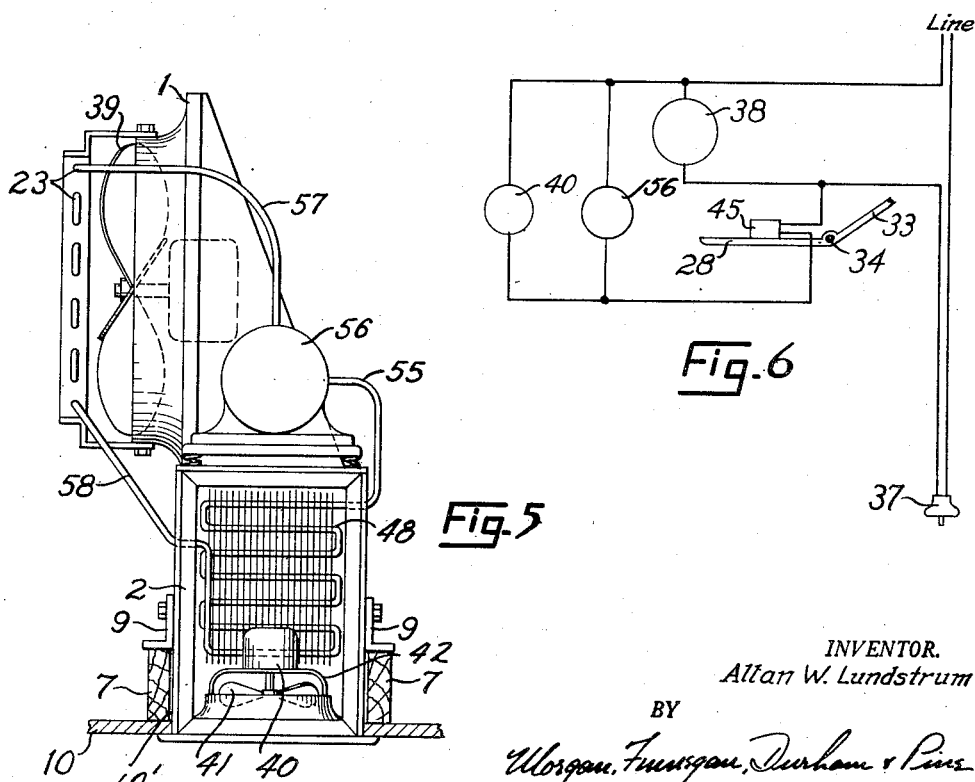
INVENTOR.
Allan W. Lundstrum
BY
ATTORNEYS

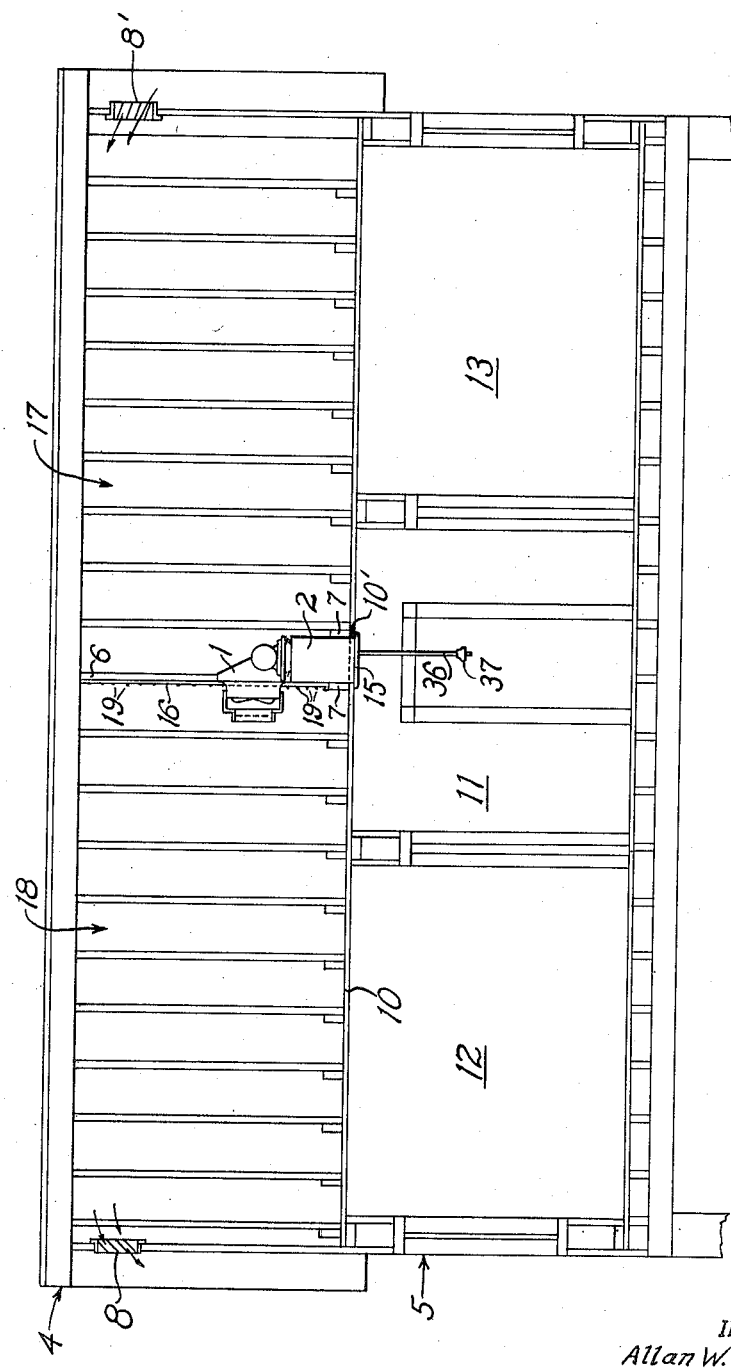

Nov. 20, 1956  A. W. LUNDSTRUM  2,770,955
AIR-CONDITIONING DEVICE FOR AN ATTIC
Filed May 17, 1954.  3 Sheets-Sheet 3
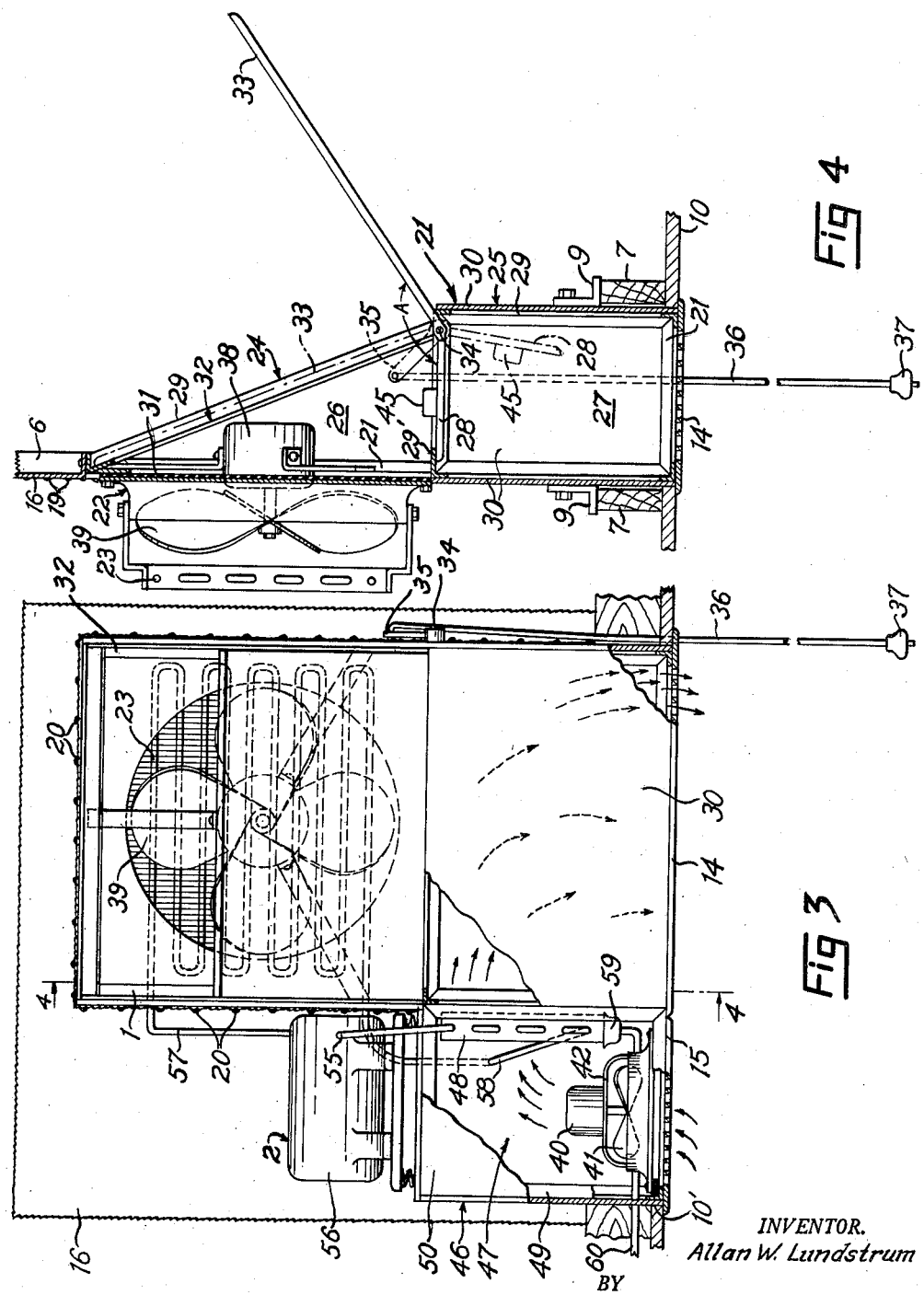
INVENTOR.
Allan W. Lundstrum
BY
ATTORNEYS

United States Patent Office 2,770,955
Patented Nov. 20, 1956

2,770,955

AIR-CONDITIONING DEVICE FOR AN ATTIC

Allan W. Lundstrum, Columbus, Ohio

Application May 17, 1954, Serial No. 430,364

13 Claims. (Cl. 62—129)

This invention relates to air-conditioning devices and relates more particularly to air-conditioning devices having utility especially for the summer air-cooling of houses.

Modern living more and more requires the maintaining of greater comfort conditions during the summer season. The accomplishment of this with presently available apparatus is either so expensive as to preclude its use in the mass market, such as exists when houses are attempted to be fully air-conditioned; or is seriously limited either by confining air-conditioning to one room as is done with room coolers, or is inadequate as results from the use of attic fans. There are three basic approaches to reduction of internal temperature in houses:

(1) "*Refrigeration and Dehumidification.*"—If refrigeration and dehumidification is used by itself, it becomes expensive both from an equipment standpoint and an operating standpoint, because of the large capacity required. Presently available apparatus generally requires cooling water which in many cities, due to water shortages in the summer, is seriously restricted. In order to save water, evaporative cooling can be resorted to but this requires bulky and unsightly equipment which is expensive and difficult to locate physically.

(2) "*Circulation of Air.*"—Circulation of air through the attic space which materially reduces ceiling temperature and, therefore, reduces heat gain into the living quarters through the ceiling.

(3) "*Attic Ventilation.*"—Attic ventilation which generally refers to a fan located in an attic which draws air out of the living space and discharges it to the outside through attic openings. Attic ventilation which exhausts air from the living space is satisfactory only during the night hours when the temperature of the outside air is lower than that in the living space.

It is among the objects of this invention to combine the above three functions in an air-conditioning device with such inter-relationship to one another that various elements of the equipment are used for more than one purpose to reduce equipment, these functions being combined in such a way that a minimum amount of, and small capacity, equipment is required to do a satisfactory job.

It is a further object of this invention to accomplish the foregoing through the provision of a new and improved air-conditioning device.

Other and further objects of this invention will appear from the following description, the accompanying drawings and the appended claims.

Basically the invention as embodied comprises a relatively small (¾ to 1½ ton) compression refrigerator together with necessary circulating fans which can be mounted between 16" O. C. ceiling joist in a central hall. All of the equipment, except a grill, is in the attic and does not take up any living space.

The condenser coil of the refrigerating unit from which the extraction heat must be dissipated does not require cooling water but utilizes air blown over it by a fan. This is standard practice in room air conditioners but this invention utilizes a fan slightly larger than would otherwise be required and located in the attic space so that the air blown over the condensing coil is circulated through the attic space at the same time. To assure a positive circulation of this air an easily installed membrane is provided with the equipment which can be tacked to rafters and ceiling joists, thus dividing the attic space into two separate compartments which permits the fan to force air to circulate through the attic space.

The device provides for two inter-related doors or dampers which allow the same fan not only to dissipate heat from the refrigerator unit and to circulate air through the attic at the same time, but also permits the use of this fan for exhausting air from the living quarters when the outside temperature makes this desirable or when it is desirable to ventilate the house quickly to dissipate smoke or odors. The design of this apparatus permits its location in the ceiling of a central portion of the house so that refrigerated air can be directed into all or any selected room by the simple expedient of opening or closing doors as desired. Thus, duct work is eliminated and comfort conditions may be maintained in whatever portion of the house it is needed at the time. However, if desired, ducts may be employed for leading the refrigerated air from the cool air outlet to any given room or rooms, through the employment of a duct kit ancillary to the air-conditioning unit. This, in effect, utilizes small refrigerating capacity which can be used in virtually the entire house as desired, instead of having the air conditioning definitely located in one room as is the case with presently available room air conditioning equipment.

The equipment is so designed that it can be lifted into the attic through the opening in the ceiling which is required for the grill. Equipment is separated into two sections, the refrigerating unit and the ventilating unit. This is done because the ventilating unit by itself will give some measure of comfort by combining attic circulating and attic ventilation for those families who do not wish to go to the expense of refrigerating equipment. It makes possible also the addition of refrigerating equipment later without expensive building changes.

The entire device is controlled by one main switch and an operating lever extending from the ceiling grill into the hall space where it can be easily reached. The operating lever governs the position of the inter-related doors which in turn governs the operation of the compressor through a mercury switch on one of the doors. The doors are so designed that they will not stay in any intermediate position which constitutes a safety and economy feature which prevents the compressor being operated unless the doors are in the proper position to confine the refrigerating effect to the atmosphere in the house. An over-temperature cut out is provided at any convenient place in the refrigeration circuit.

In the accompanying drawings which form part of the instant specification and are to be read in conjunction therewith, and in which like numbers refer to like parts throughout the several views;

Fig. 1 is a fragmentary view in vertical section of a frame house showing a typical and illustrative attic installation of the air-conditioning device of this invention;

Fig. 2 is a view in section taken along the line 2—2 of Fig. 1;

Fig. 3 is a somewhat enlarged fragmentary view in rear elevation of the air-conditioning device shown in Fig. 1, parts being broken away in order better to show the internal construction and arrangement of the device;

Fig. 4 is a view in section taken along the line 4—4 of Fig. 3;

Fig. 5 is a view in end elevation of the device of Fig. 3 as seen from the left in Fig. 3, parts of the sheathing being broken away to show the interior arrangement and construction of the refrigerating unit; and, Fig. 6 is a schematic view of the wiring diagram of the device of Fig. 3.

Referring now more particularly to the accompanying drawings, a ventilating unit 1 and a refrigerating unit 2 are mounted in side-by-side relation in the attic 3 of a typical and illustrative frame house 4. For convenience, only the attic and second story 5 of the house are depicted. The house is provided with the usual roof rafters 6 and attic floor joists 7. Ventilating louvers 8 and 8' at the opposite ends of the attic permit of air circulation through the attic.

The ventilating and refrigerating units are each dimensionally of a size such that they may be preferably disposed between and supported on a pair of the floor joists 7 with their bottom surfaces flush with the ceiling 10. To this end, each unit may be provided on one pair of its opposite sides with adjustable vertically slotted angle-iron brackets 9 which are removably bolted to the units for vertical adjustment thereon, and support the units on the top of the pair of floor joists. Floor joists are ordinarily spaced 16" on centers and the units are therefore of a size to permit the units to be lifted up into the attic through a suitable ceiling opening 10' between the joists. The opening 10' is preferably located in a central location such, for example, as that shown in Fig. 2, wherein it leads into the attic from a central upstairs hall or foyer space 11 which, in turn, is flanked by room spaces 12 and 13. The opening 10' is covered by air-directing grilles 14 and 15 removably attached to and forming part of the units 1 and 2, respectively, over the opening 10'.

A partitioning member 16 which is preferably a flexible, substantially air-tight membrane such, for example, as canvas, nylon sheeting, or other closely woven textile fabric, or paper, is hung to divide the attic into compartments 17 and 18. The membrane 16 is of a configuration to conform closely to the transverse cross-sectional shape of the attic and, as here preferably embodied, is of triangular configuration. It is substantially sealingly secured, as by tacks 19 (Fig. 1) located at suitable intervals along its base, to one of the pair of ceiling joists 7 supporting the ventilating and refrigerating units 1 and 2, respectively. Similarly, it is secured, as by tacks 19, along its sloping sides, to the correspondingly located pair of rafters 6. The membrane is also of a configuration to fit closely around the top and one pair of opposite sides of ventilating unit 1 (Fig. 3) to which it may be removably attached as by hooks, snaps, slide fasteners, or other suitable securing means 20. Thus, the membrane 16 and the ventilating unit 1 effectively confine transfer of air between the compartments 17 and 18 to a path through the ventilating unit, as will be described more fully hereinafter. As will be seen from Fig. 2, both the ventilating and refrigerating units are located in the compartment 17.

The ventilating unit 1 comprises a valved casing 21 and a Venturi-type fan assembly 22, the latter being removably mounted on the casing adjacent its front upper end. The construction and arrangement of the casing 21 is such that it may supply air to the intake side of the fan assembly from the attic compartment 17 for the purpose of effecting "circulation of air" between the attic compartments 17 and 18 or, alternatively, from the space 11 below the attic via the ceiling opening 10' for the purpose of effecting "attic ventilation." In the former case, the lower part of the casing 21 serves also simultaneously to conduct refrigerated air delivered to it from the refrigerating unit 2, back to the sub-ceiling space 11 from which it was drawn by the refrigerating unit for cooling. In either case, the relatively large volume of air delivered from the output side of the fan assembly 22 is discharged over a finned condensing coil 23 which is removably mounted on and carried by the fan assembly 22, and forms a part of the refrigerating system of the refrigerating unit 2.

The casing 21 is of a configuration in the embodiment of Fig. 4 to provide superposed upper and lower air-guiding sections 24 and 25, respectively, defining superposed compartments 26 and 27, respectively, which are adapted to be sealed off from each other by a hingedly mounted manually operable valve member 28. The casing 21, as here preferably embodied, comprises an internal structural skeleton framework 29 which is sheathed externally by air-sealing panels 30 of a suitable sound-insulating and absorbing material. Advantageously, the framework 29 may be of angle iron construction and the panels 30 may be formed of panels of "Celotex" bolted, screwed or otherwise suitably removably secured to the framework 29.

The lower compartment 27 is preferably of rectangular box-shape configuration, is closed at the front and back, as seen in Fig. 4, closed at the right hand end as seen in Fig. 3, open at the bottom, and is openable and closable at the top by the valve 28. The air-directing grill 14 is bolted or otherwise suitably removably secured to the framework 29, over the open bottom. For the purpose of enabling coupling of the refrigerating unit 2 to the ventilating unit 1 so that refrigerated air may be delivered from the refrigerating unit 2 into the compartment 27, the panel 30 which would normally cover the left hand end of the lower compartment 27, as viewed in Fig. 3, is left off or removed. The refrigerating unit 2 is then adapted to be abutted directly against this open end, as in the arrangement shown in Fig. 3. Should the refrigerating unit be removed, or not installed for any reason, this open end may be closed by application thereto of a panel similar to the panels 30.

The upper section of the casing 21 is closed at its opposite sides, is openable and closable at the back by a valve 33 and serves to support the air-circulating fan assembly 22 which is disposed over the open front of the section and is bolted, screwed or otherwise detachably connected to the framework 29, for ease of installation and removal as a unit. A vibration-dampening pad 31 of rubber or other suitable vibration absorbing material is preferably provided between the fan assembly 22 and the framework. The framework 29 in the upper section 24 is constructed and arranged to provide a rectangular valve-seat 32 sloping upwardly from the back to front of the section and defining the opening in the back of the section. A hingedly mounted manually-operable valve member 33 which is inter-related with the valve member 28 as will hereinafter be described, is adapted to be swung from an open position, shown in solid lines in Fig. 4, to a closed position in which it is seated against this valve seal, to close the open rear of the section at will. At the same time, the valve member 28 is adapted to be moved from the solid line closed position shown in Fig. 4 to the dotted line position in the same figure to place the compartments 26 and 27 in communication.

A hinge pin 34 suitably located and journalled in the framework 29 supports the valve members 28 and 33 for angular movement as a unit on the hinge pin axis between the open and closed positions aforesaid. Manual operation of this valve unit is adapted to be effected as by a crank arm 35 fastened to one end of the hinge pin 34 exteriorly of the casing 21. The crank arm 35 is provided in turn at its outer end with an operating lever 36 which is preferably flexible and is pivotally suspended therefrom. The lever 36 is of a length to extend below the ceiling 10 a distance to enable its convenient manipulation by an operator stationed in the space 11. Advantageously, the lever 36 is hollow to permit of the upward passage therethrough of wiring (not shown) leading from a main manually-operable switch 37 preferably a push-button switch, as shown, in which the lever terminates at its lower end. The switch 37 serves as shown in Fig. 6 to open and close, at will, the main circuit supplying electrical power to fan motors 38 and 40 of the ventilating and refrigerating units 1 and 2, respectively. The motor 38 drives a fan 39 of the fan assembly 22, and the motor 40 drives a fan 41 of a fan assembly 42 of the refrigerating unit 2.

The valving or damper unit formed by the valve members 28 and 33 is preferably of integral construction and is keyed or otherwise fixedly connected to the hinge pin 34 so as to be actuable by the lever 36. The valve members 28 and 33 are inclined to each other at a suitable angle "A" so that in the solid line terminal position of the valving unit as shown in Fig. 4 the valve member 28 will be seated against a valve seat 29' formed by the framework 29, and the valve member 33 will be in a fully open position. In this position air can flow to the intake side of the fan assembly 22 only through the open back of the casing 21, the compartments 26 and 27 being cut off from each other by the valve member 28.

In the dotted line terminal portions of the valving unit, the valve member 28 will be out of contact with the valve seat 29' and the valve member 33 will be seated on the valve seat 32. In this position which corresponds to the dash-dot line position of Fig. 4, air will flow to the intake side of the circulating fan 39 from the upper compartment 26 into which air is drawn from the lower compartment 27. Under these circumstances, air can be continuously exhausted from the sub-ceiling space 11 into the compartment 27 primarily via the air intake grill 14 and, to a lesser extent, via the air intake grill 15 of the refrigerating unit 20.

The inclination of the valve members 28 and 33 to each other taken with the back to front inclination of the valve seat 32 ensures that the valving unit will not stay in any position intermediate the terminal positions above mentioned. Accordingly, a mercury-switch or other suitable position-responsive switch 45 is carried by the valve member 28 for closing and opening a circuit supplying electrical power to the fan motor 40 and the compressor motor 56 of the refrigerating unit 2, in accordance with the position of the valve member 28. Thus, with the valve member 28 in its "closed" position, corresponding to the solid line position of the valve members shown in Fig. 4, the switch 45 is "on," as shown in Fig. 6, and the refrigerating unit motors 40 and 56 can operate. Conversely, when the valve member 28 is in its "open" position corresponding to its dash-dot line position as shown in Fig. 4, the switch 45 is "off" and the refrigerating unit motors cannot operate. This construction and arrangement of the valve members 28 and 33 and their valve seats 29' and 32, respectively, to ensure that the valving unit cannot stay in an intermediate position, constitutes a safety and economy feature which prevents the refrigerating unit being operated unless the valves are in the proper position to confine the refrigerative effect to the atmosphere in the sub-ceiling space. It will be understood that an over-temperature cut-out may be provided in conjunction with the compressor motor 56 so that in the event of any excessive rise in temperature in the refrigerating unit 2 including its condensing coil unit 23, it will be automatically shut off.

The refrigerating unit 2 as such comprises a casing 46 providing a compartment 47 containing the Venturi-type fan assembly 42 and a suitable finned refrigerating coil 48. The casing is closed at its top, and is open at the bottom and at its right hand side as viewed in Fig. 3. The fan assembly 42 is suitably disposed in relation to the open bottom to draw air from the hall space 11 via the grill 15 into the compartment 47 and to discharge this air over the refrigerating coil 48 through the abutting open sides of the casings 21 and 46 into the lower compartment 27 of the ventilating unit 1. Since the valve member 28 is "closed" in this case, this refrigerated air is discharged from the compartment 27 back to the hall space 11 via the ceiling grill 14. The refrigerating coil unit 48 is suitably disposed within the casing 45 in relation to the open side of the casing so that all of the air discharged into the compartment 27 of the ventilating unit passes through the coil and is cooled on its way to the compartment 27. Advantageously, the casing 45 is of rectangular box-like configuration and comprises a structural framework 49 sheathed with removable panels 50 of suitable sound absorbing and insulating material. Advantageously, also, the casing 45 is of matching configuration in vertical cross section as viewed in Fig. 4, to the lower section 25 of the ventilating unit 1, the abutting side openings of each being complementary and the units being bolted or otherwise suitably releasably coupled together in air-tight, or substantially air-tight relation to each other along their abutting sides.

The refrigerating coil unit 48 is suitably connected in closed circuit with the compressor unit 56 and the cooling coil unit 23 by means of suitable connecting pipes 55, 57 and 58 in a manner that will be obvious to those skilled in the art.

A sump or collecting basin 59 is disposed beneath the refrigerating coil unit as indicated in Fig. 3 for collecting water condensed out of the air onto the refrigerating coil. The condensate is drained from the sump through a suitable drain pipe 60 which may be disposed to conduct the condensate to the house exterior as shown in Fig. 1.

In the operation of the combined ventilating-refrigerating system shown for the purpose of refrigeration and dehumidification of air in the living space and for circulation of air through the attic space, the double door valving unit formed by the valve members 28 and 33 will have been manually pre-set by means of the lever 36 to the position shown in Fig. 4 wherein the valve member 33 is "open" and thus so inclined as by its own weight to maintain the valve member 28 in "closed" position. The main switch 37 if now manually actuated to "on," closes the parallel circuits to the ventilating fan motor 39, the refrigerating unit fan motor 40 and the compressor motor 56. The fan 39 when in rotation draws air from the attic space 17 and discharges it over the condensing coil 23 to the space 18 from which it escapes through the ventilating louvre 8. Fresh cooler replacement air enters the space 17, through the ventilating louvre 8 thus providing attic circulation. Under these circumstances, no air is drawn from the sub-ceiling spaces 11, 12 and 13 by the ventilating fan 39 since the valve member 28 is in "closed" position. However, the fan 40 of the refrigerating unit 2 draws air from the living space through the ceiling grill 15, and forces it through the refrigerating and dehumidifying coil unit 48 into the compartment 27 of the ventilating unit 1. The cooled air from the compartment is discharged therefrom through the ceiling grill 14 back into the living space below. Simultaneously with this circulation of refrigerated air, the circulating fan 39 is moving a relatively large volume of attic air over the condensing coil 23 of the refrigerating unit. This large volume of air is of a magnitude such that the extraction heat of the condensing coil is effectively dissipated without the necessity of cooling water being provided for the purpose. It will be understood that the fan 39 is larger than would be required merely for heat dissipation of extraction heat from the condensing coil 23 since it must at the same time also perform the added function of circulation of air through the attic space.

Assuming now that refrigeration and dehumidification of the air in the living space below the ceiling 10 is not required but that attic ventilation is sufficient, the lever 36 is pulled downwardly against the counteracting weight of the valve member 33 to move the latter toward its "closed" position wherein it is seated on its valve seat 32. It will be apparent that so soon as the valve member 33 passes through a vertical position it will automatically complete the balance of its movement to closed position since it will then have a counter-clockwise movement about the axis of the hinge pin 34, as viewed in Fig. 4. Because of the integral relationship of the valve members 28 and 33, the valve member 28 will also be moved counter-clockwise on the axis of the hinge pin 34 to an "open" position, as the valve member 33 moves to its "closed" position. In the open position of the valve member 28, the mercury switch 45 carried by the valve member will be "off" so that the power circuit to the refrigerating unit motors 40 and 56 will be open. The design of the double door valving unit is such that the doors will not stay in any intermediate position which constitutes a safety and economy feature which prevents the compressor being operated unless the valving doors are in the proper position to confine the refrigerating effect to the atmosphere in the living space.

In the fully closed position of the valve member 33 and the corresponding fully open position of the valve member 28, the fan 39 continues to rotate but can draw air only from the living space below the ceiling 10. This air flows to the fan 39 upwardly through the ceiling grill 14 and thence via the communicating compartments 27 and 26 of the ventilating unit 1, to the suction side of the fan 39. Air also is drawn upwardly by the fan 39 through the ceiling grill 15 of the refrigerating unit 2 and thence flows to the fan via the compartments 47, 27 and 26 seriatim. Thus, the compartment 27 of the ventilating unit serves not only as a means for conducting refrigerated air from the refrigerating unit 2 to the living space when the units are used for refrigeration and dehumidification coupled with attic circulation, but also serves as a means for conducting air from the living space to the fan 39 when the units are used only for attic ventilation. Final shut down of both units may be effected by moving the main switch 37 to "off."

The invention in its broader aspects is not limited to the specific mechanisms shown and described but departures may be made therefrom, within the scope of the accompanying claims, without departing from the principles of the invention and without sacrificing its chief advantages.

What is claimed is:

1. An air-conditioning unit comprising a ventilating unit for transferring air in a confined stream optionally from either of two separate spaces into an independent space; a refrigerating unit for cooling the air of one of said separate spaces while the ventilating unit is transferring air from the other to said independent space, said ventilating unit having a ventilating fan for drawing air from said separate spaces and discharging it into said independent space and having valve means at the intake side of said fan for confining the suction of said fan to one of said separate spaces at a time, said valve means being positionally adjustable for transferring the suction of said fan from one to the other of said separate spaces at will, and said refrigerating unit having a condensing coil disposed in the path of the air discharged by said fan, said fan having an air-moving capacity greater than that required for the necessary cooling of said condensing coil; and, means actuable by said valve means for controlling the operation of said refrigerating unit in response to the position of said valve means.

2. An air-conditioning unit comprising a ventilating unit for transferring air in a confined stream optionally from either of two separate spaces into an independent space; a refrigerating unit for cooling the air of one of said separate spaces while the ventilating unit is transferring air from the other to said independent space, said ventilating unit having separate air-intake openings for the entrance thereinto of air from said separate spaces, having an air-discharge opening for the discharge of the air into said independent space, having a ventilating fan for drawing air through said air-intake openings and discharging the air through said air-discharge opening, and having valve means at the intake side of said fan for closing one of said intake openings while leaving the other open, whereby the fan suction will be applied to only one of said separate spaces at a time, said valve means being positionally adjustable for transferring the suction of said fan from one to the other of said intake openings at will, and said refrigerating unit having a condensing coil disposed in the path of air discharged by said fan through said air-discharge opening; and, means actuable by said valve means for controlling the operation of said refrigerating unit in response to the position of said valve means.

3. An air-conditioning unit comprising a ventilating unit for transferring air in a confined stream optionally from either of two separate spaces into an independent space; a refrigerating unit for cooling the air of one of said separate spaces while the ventilating unit is transferring air from the other to said independent space, said ventilating unit having separate air-intake openings for the entrance thereinto of air from said separate spaces, having an air-discharge opening for the discharge of the air into said independent space, having a ventilating fan for drawing air through said air-intake opening and discharging the air through said air-discharge opening, and having valve means at the intake side of said fan for closing one of said intake openings while leaving the other open, whereby the fan suction will be applied to only one of said separate spaces at a time, said valve means being positionally adjustable for transferring the suction of said fan from one to the other of said intake openings at will, and said refrigerating unit having a condensing coil disposed in the path of air discharged by said fan through said air-discharge opening, having an air-intake opening for the entrance thereinto of air from one of said separate spaces, having a separate opening for the passage of air from the refrigerating unit into said ventilating unit, having a cooling coil disposed in the path of flow of said air to said ventilating unit, and having a circulating fan for moving the air in said path of flow; and, means actuable by said valve means for controlling the operation of said refrigerating unit in response to the position of said valve means.

4. An air-conditioning unit for attic installation comprising, in combination, a ventilating unit and a refrigerating unit each comprising a casing dimensioned for passage upwardly into the attic space from the living space below through a ceiling opening between the units of a pair of adjacent attic floor joists; a membrane for dividing the attic space into separate compartments in one of which said ventilating unit and said refrigerating unit are to be disposed in side-by-side relation over said opening, the casing of said ventilating unit having separate air-intake openings for the entrance thereinto of air from said last mentioned compartment and said living space, and having an air-discharge opening for the discharge of air into the other of said attic compartments, said ventilating unit also comprising a ventilating fan for drawing air through said air-intake openings and discharging air through said air-discharge opening, and valve means at the intake side of said fan for closing one of said air-intake openings while leaving the other open, whereby the suction of said fan will be applied either to said living space or to the attic compartment containing the side-by-side units, said valve means being positionally adjustable for transferring the suction of said fan from one to the other of said intake openings at will, said refrigerating unit having a condensing coil disposed in the path of air discharged by said fan through said air-discharge opening, said fan having an air-moving capacity greater than that required for the necessary cooling of said condensing coil; and, means responsive to the position of said valve means for interrupting the operation of said refrigerating unit when the suction of said fan is applied to said living space.

5. An air-conditioning unit for installation in an attic above a living space comprising, in combination, a membrane for dividing the attic into separate compartments, said membrane having an opening for the passage of air between said compartments, a ventilating unit to be installed in one of said compartments for transferring air optionally either from the compartment housing the ventilating unit or from the living space into the other of said compartments; a refrigerating unit to be installed in the compartment with said ventilating unit for cooling the air of said living space while the ventilating unit is transferring air into the other of said compartments, said units each being dimensioned for passage upwardly into the attic from the living space below through a ceiling opening between the units of a pair of adjacent attic floor joists, said ventilating unit having a ventilating fan for drawing air from the compartment in which it is located and from the living space and discharging it through the opening in said membrane into the other of said compartments, having valve means for selectively establishing at will communication between either the compartment housing said units and the living space and the intake side of said fan, and said refrigerating unit having a condensing coil disposed at the exhaust side of said fan in the path of flow of air discharging therefrom, said fan having an air-moving capacity greater than that required for the necessary cooling of said condensing coil; and, means responsive to the position of said valve means for interrupting the operation of said refrigerating unit when the suction of said fan is applied to said living space.

6. An air-conditioning unit in accordance with claim 8, said valve means comprising separate valve members fixedly connected together at an obtuse angle to form a unitary structure, said structure being mounted for limited angular displacement between terminal positions of rest, substantially on a horizontal rotational axis with one of said valve members disposed to extend upwardly from the plane of said axis, whereby said structure will not stay in any position intermediate said terminal positions; said position-responsive means for interrupting the operation of said refrigerating unit being carried by the other of said valve members; and, manually operable means for moving said structure from one to the other of said positions.

7. An air-conditioning unit in accordance with claim 6 in which said position-responsive means is a mercury switch.

8. An air-conditioning unit in accordance with claim 6 in which said manually operable means includes a main circuit-controlling switch.

9. An air-conditioning unit for attic installation comprising a ventilating unit for transferring air either from one end of an attic, or from a living space below the attic, to the other end of the attic; and, a refrigerating unit for cooling the air of said living space while the ventilating unit is transferring air from said one end of the attic to said other end, said ventilating unit having a large capacity ventilating fan for drawing air in large quantities either from said one end of said attic or from said living space and discharging it into said other end of said attic and having valve means for selectively establishing at will communication between either said one end of said attic or said living space and the intake side of said fan, and said refrigerating unit having an air-circulating fan for independently cycling air from and to said living space while said ventilating fan is transferring air from said one end of said attic to said other end, and having a condensing coil disposed at the exhaust side of said ventilating fan in the path of flow of air discharged therefrom.

10. An air-conditioning unit for attic installation comprising a ventilating unit for transferring air in a confined stream either from one end of an attic, or from a living space below the attic, to the other end of the attic; and, a refrigerating unit for cooling the air of said living space while the ventilating unit is transferring air from said one end of the attic to said other end, said ventilating unit having a large capacity ventilating fan for drawing air in large quantities either from said one end of said attic or from said living space and discharging it into said other end of said attic and having valve means at the intake side of said fan through which the suction of said fan may be applied either to said one end of said attic or to said living space, said valve means being positionally adjustable for transferring the suction of said fan from one to the other of said one end of said attic space and said living space, at will, and said refrigerating unit having an air-circulating fan for independently cycling air from and to said living space while said ventilating fan is transferring air from said one end of said attic to said other end, and having a condensing coil disposed at the exhaust side of said ventilating fan in the path of flow of air discharged therefrom, said ventilating fan having an air-moving capacity greater than that required for the necessary cooling of said condensing coil.

11. An air-conditioning unit for attic installation comprising a ventilating unit for transferring air in a confined stream either from one end of an attic, or from a living space below the attic, to the other end of the attic; and, a refrigerating unit for cooling the air of said living space while the ventilating unit is transferring air from said one end of the attic to said other end, said ventilating unit having separate air-intake openings for the entrance thereinto of air from said one end of the attic and said living space, respectively, having an air-discharging opening for the discharge of the air therefrom to said other end of said attic, having a large capacity ventilating fan for drawing air in large quantities through one or the other of said air-intake openings and discharging the air through said air-discharge opening, and having valve means at the intake side of said fan for closing one of said intake openings while leaving the other open, whereby the fan suction will be applied to only said one end of said attic or to said living space, at a time, said valve means being positionally adjustable for transferring the suction of said fan from one to the other of said intake openings, at will, and said refrigerating unit having an air-circulating fan for independently cycling air from and to said living space while said ventilating fan is transferring air from said one end of said attic to said other end, and having a condensing coil disposed in the path of air discharged by said ventilating fan through said air-discharge opening.

12. An air-conditioning unit for attic installation comprising, in combination, a ventilating unit and a refrigerating unit each comprising a casing dimensioned for passage upwardly into the attic space from the living space below through a ceiling opening between the units of a pair of adjacent attic floor joists; a membrane for dividing the attic space into separate compartments in one of which said ventilating unit and said refrigerating unit are to be disposed in side-by-side relation over said opening, the casing of said ventilating unit having separate air-intake openings for the entrance thereinto of air from said last mentioned compartment and said living space, and having an air-discharge opening for the discharge of air into the other of said attic compartments, said ventilating unit also comprising a ventilating fan for drawing air through said air-intake openings and discharging air through said air-discharge opening, and valve means at the intake side of said fan for closing one of said air-intake openings while leaving the other open, whereby the suction of said fan will be applied either to said living space or to the attic compartment containing the side-by-side units, said valve means being positionally adjustable for transferring the suction of said fan from one to the other of said intake openings at will, said refrigerating unit having a condensing coil disposed in the path of air discharged by said fan through said air-discharge opening, and said fan having an air-moving capacity greater than that required for the necessary cooling of said condensing coil.

13. An air-conditioning unit for installation in an attic above a living space comprising, in combination, a membrane for dividing the attic into separate compartments, said membrane having an opening for the passage of air between said compartments, a ventilating unit to be installed in one of said compartments for transferring air optionally either from the compartment housing the ventilating unit or from the living space into the other of said compartments; a refrigerating unit to be installed in the compartment with said ventilating unit for cooling the air of said living space while the ventilating unit is transferring air into the other of said compartments, said units each being dimensioned for passage upwardly into the attic from the living space below through a ceiling opening between the units of a pair of adjacent attic floor joists, said ventilating unit having a ventilating fan for drawing air from the compartment in which it is located and from the living space and discharging it through the opening in said membrane into the other of said compartments, having valve means for selectively establishing at will communication between either the compartment housing said units and the living space and the intake side of said fan, and said refrigerating unit having a condensing coil disposed at the exhaust side of said fan in the path of flow of air discharging therefrom, said fan having an air-moving capacity greater than that required for the necessary cooling of said condensing coil.

References Cited in the file of this patent

UNITED STATES PATENTS

| | | |
|---|---|---|
| 2,300,848 | Shelton | Nov. 3, 1942 |
| 2,488,589 | Eberhart | Nov. 22, 1949 |
| 2,682,757 | Borgerd | July 6, 1954 |